(12) United States Patent
Sakama

(10) Patent No.: US 8,434,688 B2
(45) Date of Patent: May 7, 2013

(54) RFID TAG AND METHOD OF MANUFACTURING THE SAME

(75) Inventor: Isao Sakama, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 13/021,069

(22) Filed: Feb. 4, 2011

(65) Prior Publication Data

US 2011/0220724 A1    Sep. 15, 2011

(30) Foreign Application Priority Data

Mar. 11, 2010   (JP) ................... 2010-053942

(51) Int. Cl.
*G06K 19/06* (2006.01)
(52) U.S. Cl.
USPC ............................ 235/492; 235/380; 235/451
(58) Field of Classification Search .................. 235/492, 235/380, 441, 382, 382.5, 451, 487, 375
See application file for complete search history.

(56) References Cited

U.S. PATENT DOCUMENTS

| | | |
|---|---|---|
| 2002/0167450 A1 | 11/2002 | Korden et al. |
| 2003/0112192 A1 | 6/2003 | King et al. |
| 2005/0093677 A1 | 5/2005 | Forster et al. |
| 2005/0134460 A1 | 6/2005 | Usami |
| 2006/0043198 A1 | 3/2006 | Forster |
| 2008/0036608 A1 | 2/2008 | Sakama |
| 2008/0111760 A1 | 5/2008 | Sakama et al. |
| 2010/0035539 A1* | 2/2010 | Yoshida et al. .................... 455/1 |

FOREIGN PATENT DOCUMENTS

JP    2005-157918 A    6/2005

OTHER PUBLICATIONS

European Patent Office; extended Search Report on application No. 11153261.0 mailed Apr. 5, 2012.
I Communication pursuant to Article 94(3) EPC on application 11 153 261.0 dated Jan. 7, 2013; 3 pages.

* cited by examiner

*Primary Examiner* — Edwyn Labaze
(74) *Attorney, Agent, or Firm* — Foley & Lardner LLP

(57) ABSTRACT

An RFID tag prevents reduction of communication characteristics due to mutual interference of RFID tags and enables to collectively read plural densely arranged RFID tags by a reader apparatus even when the plural RFID tags are in a densely arranged state. The RFID tag of the present invention is an RFID tag having an IC chip and a first antenna connected to the IC chip, provided with an impedance matching circuit for performing impedance matching between the IC chip and the first antenna, and arranged by stacking a conductor to cover the impedance matching circuit via an insulator base material.

15 Claims, 12 Drawing Sheets

RFID TAG AND METHOD OF MANUFACTURING THE SAME

INCORPORATION BY REFERENCE

The present application claims priority from Japanese application JP 2010-053942 filed on Mar. 11, 2010, the content of which is hereby incorporated by reference into this application.

TECHNICAL FIELD

The present invention relates to a RFID tag which transmits or receives information by radio and a method of manufacturing it.

BACKGROUND ART

In recent years, use of an RFID (Radio Frequency Identification) tag using a semiconductor chip capable of reading and writing information is expanding for information management and distribution management of articles.

The RFID tag includes an IC chip having a memory for recording information, an antenna for transmitting information which is recorded in the memory of the IC chip by radio and for receiving information and power transmitted, and a base material on which the antenna is mounted. Since the information recorded in the IC chip can be communicated to a reader/writer, the information recorded in the IC chip can be read in a non-contact state by the reader/writer. And, information can be reversely written into the IC chip.

For a UHF (Ultra High Frequency) band or SHF (Super High Frequency) band antenna of the RFID tag, a belt-like dipole antenna is mainly used. For example, this antenna is formed by forming a conductor into a rectangular plate shape or coating a conductor of an Ag paste onto the base material. Here, the antenna is formed with an L shape slit having an impedance matching mechanism for performing impedance matching between the antenna and the IC chip.

The IC chip of the RFID tag can also be provided with a congestion control function capable of collectively reading plural RFID tags by a reader apparatus. Thus, there are cases that plural documents to which the RFID tags are attached are managed collectively.

PRIOR ART REFERENCE

Patent Reference

Patent Reference 1: JP-A2005-157918 FIG. 1)

SUMMARY OF THE INVENTION

In a case where the RFID tag is attached to documents, the RFID tag is generally attached to the same points of the documents for the convenience of a format of the documents. But, when the RFID tag-attached documents are thin and bundled, the RFID tags are mutually approached into a layered state. In such a state, impedance matching between the IC chip and the antenna of the RFID tag changes from a value adjusted by the RFID tag in an isolated state. This impedance change reduces the communication distance of the RFID tag considerably and makes it hard to communicate in some cases. As a result, when there are large numbers of RFID tags together, the RFID tags become unusable.

To remedy the above disadvantages, the RFID tag according to the present invention has a conductor which is overlaid to cover an impedance matching circuit for performing impedance matching between the IC chip and the tag antenna.

The present invention makes it possible to provide the communication distance of the RFID tags even when the RFID tags are arranged close to one another.

Other objects, features and advantages of the invention will become apparent from the following description of the embodiments of the invention taken in conjunction with the accompanying drawings.

DETAILED DESCRIPTION OF THE INVENTION

Figure 1A:
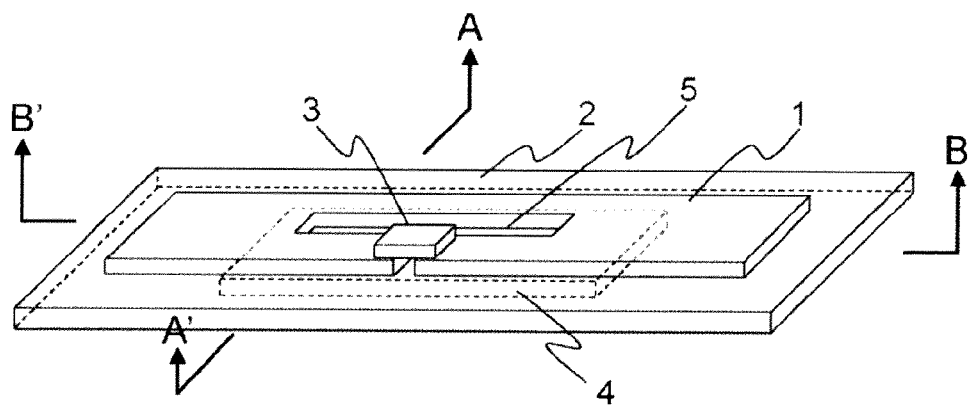
FIG. 1A is a view showing an RFID tag of a first embodiment.

The structure of the RFID tag according to the present invention is described below in detail.

<RFID Tag>

The RFID tag shown in FIG. 1 comprises an IC chip 3 in which information to be read by a reader/writer (not shown) is recorded, a first antenna 1 to which the IC chip 3 is connected via terminals, an insulator base material 2 on which the first antenna 1 is mounted, a T-shape impedance matching circuit 5 for performing impedance matching between the first antenna 1 and the IC chip 3 on the first antenna 1, and a conductor 4 having electrical conductivity which is arranged to cover the impedance matching circuit 5

<IC Chip 3 of RFID Tag>

The IC chip 3 of the RFID tag has, for example, a rectifier circuit for converting AC, which is entered the first antenna 1, into DC, a demodulation circuit for restoring the command, data etc transmitted from the reader/writer to a signal sequence of "1" and "0", a modulation circuit for modulating a carrier wave by transmission data to the reader/writer, a control circuit for controlling transmission and reception of information, reading and writing from and to an Internal memory, etc., and a memory for storing information.

<First Antenna 1 of RFID Tag>

The first antenna 1 of the RFID tag is formed by fixing a foil of aluminum, copper or the like onto the insulator base material 2 and etching or by printing or the like of a metal vapor-deposited film having electrical conductivity or a conductive paste of silver or the like onto the insulator base material 2, and mounting the IC chip on it. By configuring in this way, a reader/writer (not shown) is used to read the information stored in the memory of the IC chip 3 or to record information in the memory of the IC chip 3 via the first antenna 1 by radio.

When the antenna, is a dipole antenna, the first antenna 1 has the T-shape slit 5 for impedance matching as shown in FIG. 1A. The slit 5 is formed by etching aluminum or the like used for the antenna material or masking when aluminum or the like used to form the antenna is vapor-deposited. Here, one end of the T-shape slit 5 is extended to one end edge portion in the short-side direction of the first antenna 1 to separate the one end in the short-side direction of the antenna 1. And, two terminals 3a and 3b (not shown) of the IC chip 3 are connected to the first antenna 1 to extend over a portion extended to one end edge portion in the short-side direction of the antenna 1 of the T-shape slit 5. The T-shape slit 5 may also be an L-shape slit and may be any shape if impedance matching can be performed.

<Congestion Control Function of IC Chip 3>

A function to collectively read information written in plural RFID tags is called congestion control and there are a variety of control methods. As an often-used method, unique numbers are previously given to IC chips and sequentially called by a reader apparatus to sequentially call the plural tags. The RFID tags to be read collectively must be held in an operating state by energy of electromagnetic waves irradiated by the reader apparatus until all of the tags are read.

<Reduction of Interaction of Nearby RFID Tags>

To efficiently operate the RFID tag, it is necessary to adequately perform impedance matching between the tag antenna and the IC chip. And it has been confirmed by experiments performed by the present inventors that if a metallic piece is approached to the RFID tag antenna portion, a change in impedance is largest when the metallic piece is approached to the impedance matching circuit portion.

In this embodiment, attention was paid to the impedance matching circuit portion, and it was protected by a conductor, so that a change in impedance is small even when a metallic body such as another RFID tag antenna is approached thereto. The RFID tag of this embodiment has a structure that the impedance matching circuit portion of the IC chip formed on the IC chip-mounted antenna and the antenna is covered by a conductor with an insulator interposed therebetween. For example, when a metallic piece is approached to the impedance matching circuit portion of the antenna from the conductor surface, there is substantially no influence of the metallic piece since an electrically conductive conductor is previously disposed on the impedance matching circuit portion. If the metallic piece is similarly approached from the surface not provided with the conductor (surface on the side opposite to the side where the conductor is disposed), a change in impedance is large but when the base material is thin, namely when the distance between the antenna and the conductor is short, the change in impedance can be reduced by the effect of the conductor on the back surface.

In other words, an interval between the antenna having the impedance etching circuit be IC chip and the conductor covering the impedance matching circuit is made small in this embodiment.

An example of the relationship between the antenna and the metallic body includes the following. The RFID tag which is usable even when attached to a metal is operated by separating the metal surface and the RFID tag by inserting a spacer having a thickness of several millimeters between the RFID tag and the metal surface. But, such an RFID tag stops operating if the metallic body is approached to the tag antenna surface. It is because the metallic body cannot be used similar to the conductor of this embodiment because the antenna and the metallic body are separated by the distance of several millimeters.

A patch antenna used for a reader antenna or the like also has a large ground electrode on the back surface of a radiation antenna portion, but if another metallic body is approached to the radiation antenna surface, the impedance of the antenna is changed, and the antenna characteristics are deteriorated because the interval between the radiation antenna and the ground electrode is several tens of millimeters. The metallic body is arranged on the back surface of the antenna in the above examples, but since the interval between the antenna and the metallic body is large (several millimeters), the effect of the conductor arranged on the back surface of the impedance matching portion as in the present invention cannot be obtained and the antenna characteristics are changed.

First Embodiment

Figure 1B:
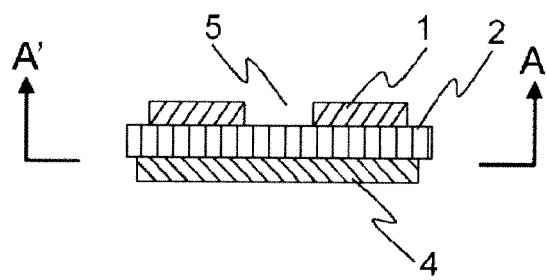
FIG. 1B is the A-A' sectional view of FIG. 1A.
Figure 1C:
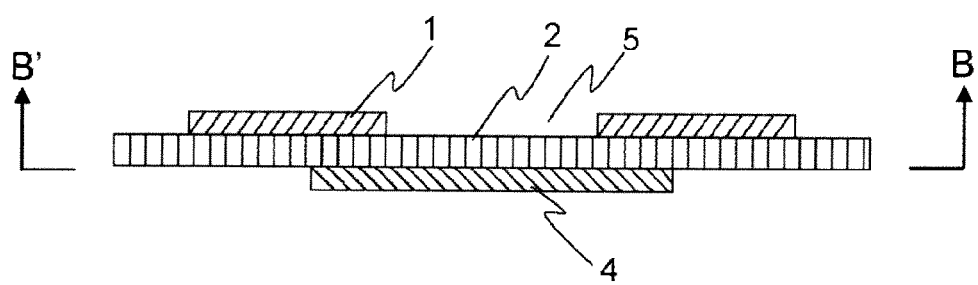
FIG. 1C is the B-B' sectional view of FIG. 1A.

FIG. 1A is a view showing the RFID tag according to a first embodiment, FIG. 1B is the A-A' sectional view of FIG. 1A, and FIG. 1C is the B-B' sectional view of FIG. 1A.

The RFID tag of the first embodiment manages, information by reading the information recorded in the memory of the IC chip 1 by a reader/writer not shown) and is used it a form of for example, a label, a seal or the like and attached to articles.

The REID tag of the invention has the IC chip 3 and the first antenna 1 which is connected to the IC chip 3, and the IC chip 3 has two metallic terminals 3a and 3b (not shown) for signal input and output. The two terminals are connected to both ends of the T-shape slit 5 which is an impedance matching circuit within the first antenna 1. The IC chip has two dummy terminals, and individual terminals are arranged at four corners of the IC chip such that the IC chip and the antenna become parallel to each other (in the flowing embodiment, the terminals denote terminals which allow passage of electricity but do not denote dummy terminals). The two terminals of the IC chip 3 are connected to the first antenna 1 with low electrical resistance by ultrasonic bonding, metal eutectic bonding or a conductive adhesive. In addition, the IC chip 3 and the first antenna 1 are mutually fixed by an unshown adhesive. As shown in FIG. 1B, the insulator base material 2 is stacked on the first antenna 1 so as to hold the first antenna 1, and the conductor 4 having electrical conductivity on the surface opposite to the first antenna 1 is formed via the insulator base material 2 so as to cover the T-shape slit 5 for performing impedance matching. And, the first antenna 1, the conductor 4 and the insulator base material 2 are fixed by an unshown adhesive. As shown in FIG. 1C, the T-shape slit 5 is covered by the conductor 4 via the insulator base material 2, and the slit formed of the T-shape slit is in a closed state.

The insulator base material 2 is composed of PFT (PolyEthylene Terephthalate), PEN (PolyEthylene naphtha late), PP (Polypropylene) or the like. In this embodiment, 0.03 mm thick PEN was used as the material for the insulator base material 2.

The first antenna 1 is 90 mm long and 3.5 mm wide, and the T-shape slit is 20 mm long in the longitudinal direction. The length of the antenna denotes the horizontal direction in FIG. 1C, and the width of the antenna denotes the horizontal direction in FIG. 1B. The length of the conductor 4 corresponding to the longitudinal direction of the first antenna is 26 mm, and the width of the conductor 4 corresponding to the short-side direction of the first antenna 1 is 4 mm. In this configuration, the T-shape slit 5 which is an impedance matching circuit formed on the first antenna 1 is fully covered via the insulator base material 2. For the first antenna 1 and the conductor 4, an aluminum foil having 0.012 mm in thickness was used, adhered to both surfaces of the insulator base material by an adhesive, and the both surfaces were etched to form the first antenna 1 and the conductor 4.

Figure 2:
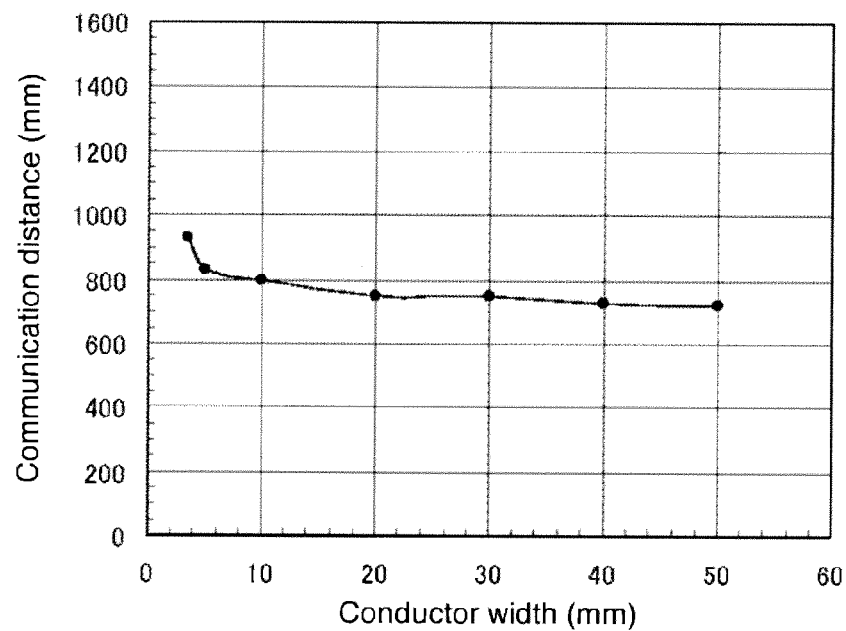
FIG. 2 is a view showing a relationship between the width of a conductor 4 and a communication distance of the RFID tag of the embodiment.

Optimization of the width of the conductor 4 is described with reference to FIG. 2. FIG. 2 shows the relationship between the width of the conductor 4 and the communication distance of the RFID tag of this embodiment. The center of the conductor 4 in the breadth direction and the center of the first antenna 1 in the short-side direction are aligned, and the center of the first antenna 1 in the longitudinal direction is also aligned. It is seen that even when the width of the conductor 4 is increased to 4 to 50 mm while completely covering the T-shape slit 5, the communication distance of the RFID tag does not change largely. Therefore, in view of manufacturing the RFID tag in a small size, it is advantageous that the width of the conductor 4 is equal to the width of the first antenna or the width of the insulator base material 2.

Figure 3:
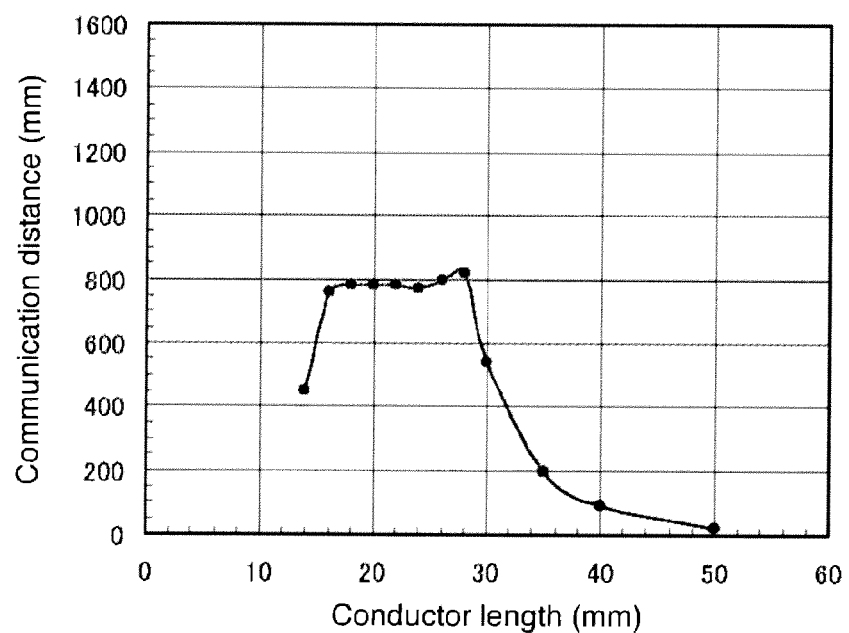
FIG. 3 is a view showing a relationship between the length of the conductor 4 and the communication distance.

The relationship between the length of the conductor 4 and the communication distance is described with reference to FIG. 3. FIG. 3 shows the relationship between the conductor length and the communication distance, the center of the conductor 4 in the longitudinal direction and the center of the first antenna 1 in the longitudinal direction are aligned, and their centers in the short-side direction are also aligned. The shown communication distance was obtained when the length of the conductor 4 was varied so as to extend the conductor 4 from the center of the T-shape slit 5 in the longitudinal direction and the length of the conductor 4 was set to 14 to 50 mm. When the conductor 4 is 20 mm long, the T-shape slit 5 is completely covered. Thus, when the conductor 4 is 26 to 28 mm long, the maximum communication distance can be obtained. It is required that the T-shape slit of the impedance matching circuit is 20 mm long, and the conductor length is 20 to 28 mm to arrange the conductor to cover it.

Figure 4:
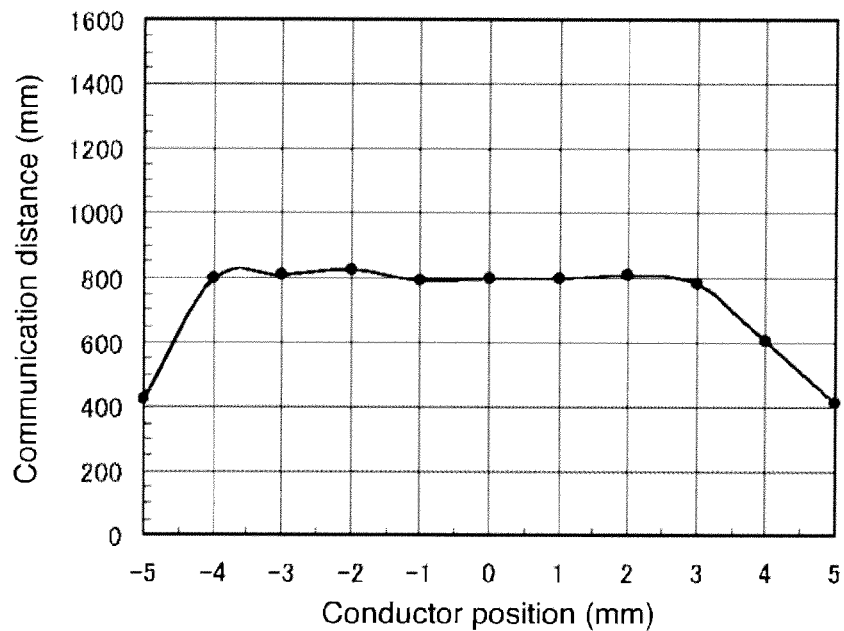
FIG. 4 is a view showing a change in communication distance when the conductor 4 is moved along the longitudinal direction of a first antenna 1.

Alignment precision relationship between the T-shape 5 of the impedance matching circuit and the conductor 4 is also described with reference to FIG. 4. For example, the conductor 4 having a length of 20 mm and a width of 4 mm is moved along the longitudinal direction of the first antenna 1, and a change in communication distance is shown in FIG. 4. In this case, the conductor 4 is arranged to cover the T-shape slit 5, and the center of the conductor 4 in the longitudinal direction and the center of the T-shape slit 5 in the longitudinal direction are determined as the origins. The horizontal axis of the graph shows the position of the conductor 4, indicating the center position of the conductor 4 with the center of the slit 5 in the longitudinal direction determined as the origin. Thus, when the position of the conductor 4 is in a range of −4 to +3 mm, the communication distance does not change. Therefore, the optimum value of the conductor length considering the alignment precision is 26 mm.

Figure 5:
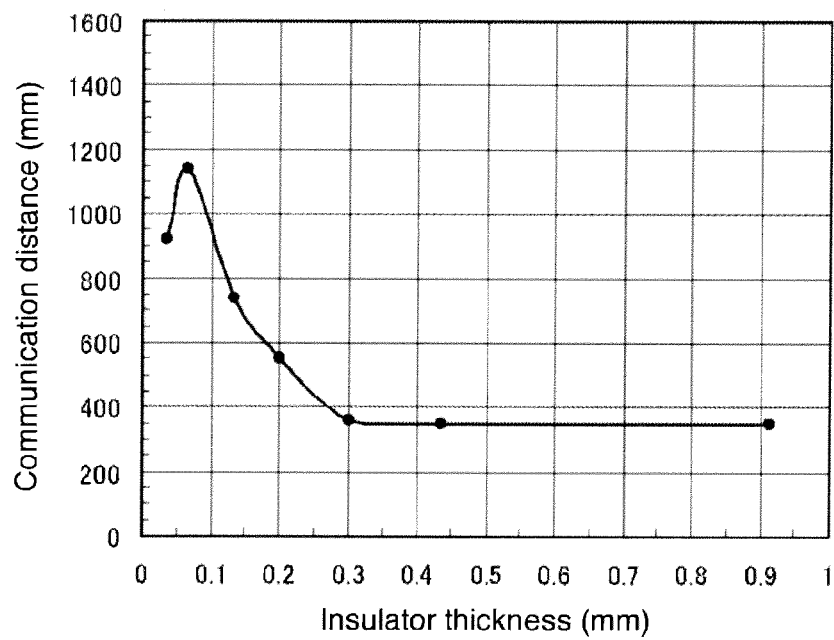
FIG. 5 is a view showing a relationship between the thickness of an insulator base material 2 and the communication distance of a single RFID tag.

The thickness of the insulator base material 2 is an important factor of the RFID tag of the invention. The relationship between the thickness of the insulator base material 2 and the communication distance is described with reference to FIG. 5. For the first antenna 1 and the conductor 4, an aluminum foil 0.012 mm thick was used and for the insulator base material 2, PET was used. FIG. 5 shows characteristics that the communication distance does not change when the insulator base material 2 is 0.3 to 0.9 mm thick, and the communication distance becomes long when the thickness is 0.3 mm or less. The lower limit here is 0.005 mm. In other words, FIG. 5 shows characteristics that the communication distance becomes long when the insulator base material 2 is 0.005 mm or more and 0.3 mm or less in thickness. And according to the experimental result of FIG. 5, the communication distance was maximum when the thickness was 0.06 mm. Since PET, PEN or the like which is a base material for holding the widely used RFID tag antenna is 0.02 to 0.06 mm thick, formation of the first antenna 1 and the conductor 4 on both surfaces of the base material is advantageous in view of manufacturing because no additional member is required.

Figure 6:
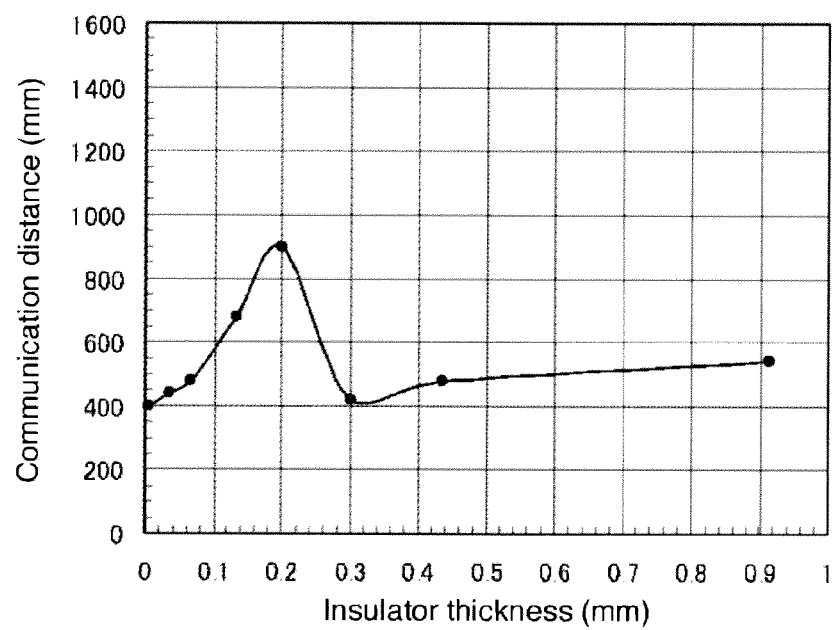
FIG. 6 is a view showing a relationship between the thickness of the insulator base material 2 and the communication distance of RFID tags arranged at intervals of 0.3 mm.

An influence of the distance between the first antenna 3 acid the conductor 4 when another RFID tag approaches is described with reference to FIG. 6. FIG. 6 is a result obtained by stacking three RFID tags of the first embodiment at intervals of 0.3 mm, varying the thickness of the insulator base material 2 of the RFID tag and measuring the communication distance of the RFID tag arranged at the center. It can be confirmed from FIG. 6 that a communication distance of 400 mm is obtained when the insulator base material 2 is 0.005 mm or more in thickness. Even when the insulator base material 2 is 0.9 mm thick, its communication distance is 560 mm, and there is no advantage of increasing the thickness of the insulator base material 2, but it is advantageous to make the insulator base material 2 thinner, so that the RFID tag itself can be made thin, and convenience can be improved.

The communication distance of the RFID tag used alone can be made long by making the thickness of the insulator base material 2 thinner than 0.3 mm as shown in FIG. 5. Therefore, when the thickness of the insulator base material 2 is set to 0.005 to 0.3 mm, excellent communication characteristics can be obtained when the RFID tag is used alone and when the RFID tags are arranged in a layered state. Thus, the convenience of the RFID tag can be established in the above two conditions.

According to the measurement results of FIG. 6, when the interval between the first antenna and the conductor 4 is made smaller than the arrangement interval of 0.3 mm of the RFID tags, namely when the thickness of the insulator base material 2 is set to 0.2 mm, the maximum communication distance can be obtained. Thus, it is indicated that when the plural RFID tags are arranged in the overlaid state, the maximum communication distance can be obtained when the thickness of the insulator base material 2 is made smaller than the intervals of the RFID tags.

The above phenomenon can be explained as follows. It is assumed that the interval between the first antenna and the conductor 4 of the RFID tag is t1, the above structured plural RFID tags are arranged at a distance t2, and the RFID tags are operable in the above state. At this time, even if the first antenna of a certain RFID tag is approached by another RFID tag antenna, the metallic body closest to the first antenna becomes the conductor 4 which is a configuring member of its own RFID tag if t1 is smaller than t2, and an influence of the approaching latter metallic body seems smaller. Therefore, the change in characteristics of the first antenna becomes small, and the decrease in communication distance becomes small. But if t1 is larger than t2, the influence of the approaching other metallic body becomes prominent, and the change in characteristics of the first antenna becomes large.

In other words, if the insulator base material is thick, the distance between the impedance matching circuit and the other metallic body becomes smaller than the thickness of the insulator base material, so that the change in impedance becomes large, and the RFID tag performance lowers.

In view of the above results, fifty RFID tags including the insulator base material 2 having a thickness of 0.02 mm and the conductor 4 (26 mm long and 4 mm wide) were used and fixed to general 0.1 mm thick sheets by 0.03 mm thick adhesive seals. The RFID tags were attached to the same positions of the sheets, so that when the sheets were stacked, the RFID tags were also substantially stacked. And, the intervals of the REID tags become about 0.2 mm which is a total of the sheet, the conductor 4, the insulator base material 2, the first antenna 1, the adhesive between the insulator base material 2 and the conductor 4, the adhesive between the insulator base material 2 and the first antenna, and the adhesive seal. Therefore, there is established a relationship of the insulator base material 2 (0.02 mm)<RFID tag interval (0.2 mm). In this state, reading experiments were performed by a 950 MHz band reader apparatus having a high frequency power of 500 mW. As a result, all fifty RFID tags could be read collectively. Thus, the arrangement of the conductor to cover the impedance matching circuit of the antenna provides a remarkable effect of improving the collective reading performance of the very close RFID tags.

For comparison, when conventional general-purpose RFID tags are arranged at a very small interval of about 0.2 mm, the RFID tags cannot be operated. Even if the RFID tag interval is increased to about 5 mm, only several RFID tags near the reader apparatus can be read.

In addition, the length of the first antenna 1 was determined to have a shortened form of about $\lambda/4$ long at an operating frequency of 950 MHz in the first embodiment, but when a larger communication distance is required, it can be achieved by increasing the antenna length to a general electric $\lambda/2$.

Second Embodiment

Figure 7A:
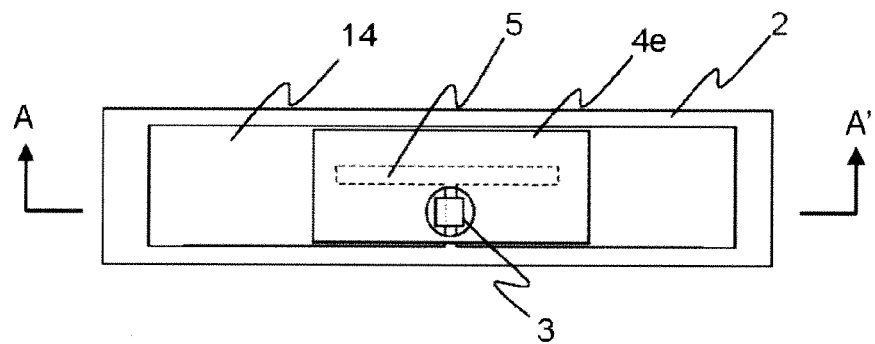
FIG. 7A is a view showing an RFID tag of a second embodiment.
Figure 7B:
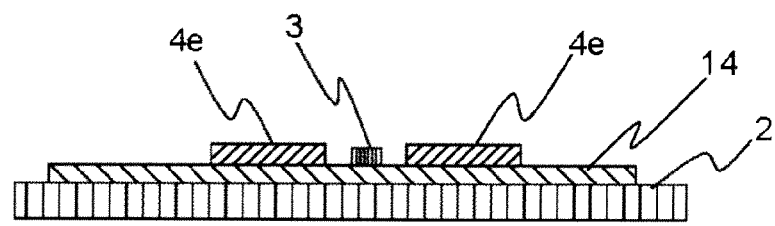
FIG. 7B is the A-A' sectional view of FIG. 7A.
Figure 7C:
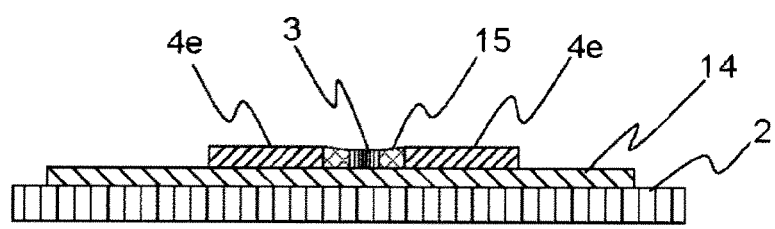
FIG. 7C is an applied view of FIG. 7B.

A second embodiment is a modified example of the first embodiment. FIG. 7A is a view showing the RFID tag of the second embodiment, FIG. 7B is the A-A' sectional view of FIG. 7A, and FIG. 7C is an applied view of FIG. 7B. The first embodiment had the conductor 4 arranged on the back surface of the first antenna 1 via the insulator base material 2. In the second embodiment, it is configured that a conductor 4e is stacked on the surface of a first antenna 14 where an IC chip 3 is mounted by using an adhesive material or a sticking material (not shown) of about 0.005 to 0.02 mm thick as shown in FIG. 7A. The conductor 4e has a round cutout to avoid the IC chip 3. This cutout is not limited to the circle but may be any shape of cutout or notch. In this embodiment, an adhesive material or a sticking material is used as the insulator between the first antenna 14 and the conductor 4e, so that the first antenna and the conductor 4e can be configured to have the insulator with a desired thickness. Thus, a first antenna 14 and the conductor 4e can be made closer to each other than the thickness of the insulator base material 2. From the previously described relationship between the insulator thickness and the approaching RFID tag, it becomes effective if the RFID tag approaches very closely, namely, if the RFID tag is attached to every thin sheet.

As shown in FIG. 7B, since the IC chip 3 fits in the cutout formed in the conductor 4e, the IC chip 3 does not protrude from the surface of the RFID tag, so that there are obtained an effect that the RFID tag surface is made flat and an effect that the strength is protected to prevent dropout of the IC chip. FIG. 7C shows that in order to improve the effects additionally, an epoxy resin 15 is filled into the gap formed between the cutout of the conductor 4e and the IC chip 3 to improve flatness and strength.

Third Embodiment

Figure 8A:
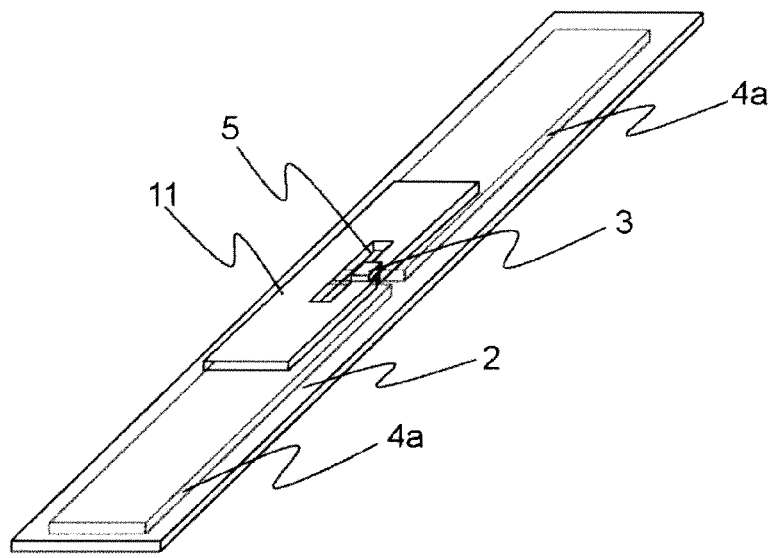
FIG. 8A is a view showing the RFID tag of a third embodiment.

It was described in the first embodiment that the conductor 4 had an optimum length, and a third embodiment is described with reference to FIG. 8A, FIG. 8B and FIG. 8C to provide a subject structure that the interaction of approaching RFID tags is reduced by a conductor having a desired length. FIG. 8A is a view showing the RFID tag of this embodiment, FIG. 8B is a top view of FIG. 8A, and FIG. 8C shows a modified example of the positional relationship between conductors 4a and a slit 5.

The planar dipole antenna of this embodiment provides the best antenna efficiency when the antenna length is electric $\lambda/2$. But, if a metallic body such as another RFID tag approaches the antenna which is in the best state to come close to the antenna end portion, the antenna is capacitively-coupled with the metallic body to provide an effect as if the antenna length became long, and the antenna impedance is changed. When the metallic body approaches the impedance matching portion at the center portion of the antenna, the impedance changes largely as described above, and the communication distance changes largely. Therefore, if the antenna length is the electric $\lambda/2$ long, the impedance change becomes large regardless of winch part of the RFID tag the metallic body approaches to.

If a first antenna 11 is shorter than the electric $\lambda/2$ long and the metallic body such as another RFID tag approaches the antenna end portion, the antenna is capacitively-coupled with the metallic body to provide an effect as if the effective antenna length became long, so that the antenna becomes longer than the antenna impedance change, and the effect that the antenna efficiency is improved becomes larger. Even in this case, when the metallic body approaches the impedance matching port on at the center of the antenna, the subject that the impedance change becomes large is same. From the above, it is advantageous that the first antenna 11 is shorter than the electric $\lambda/2$ long, and it has been confirmed by experiments performed by the present inventors that $\lambda/6$ to $\lambda/4$ long is good antenna length.

Figure 8B:
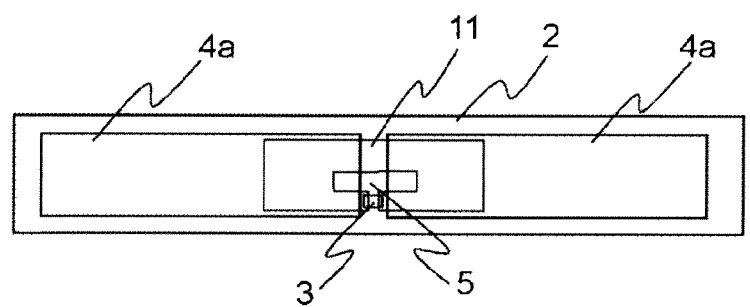
FIG. 8B is a top view of FIG. 8A.
Figure 8C:
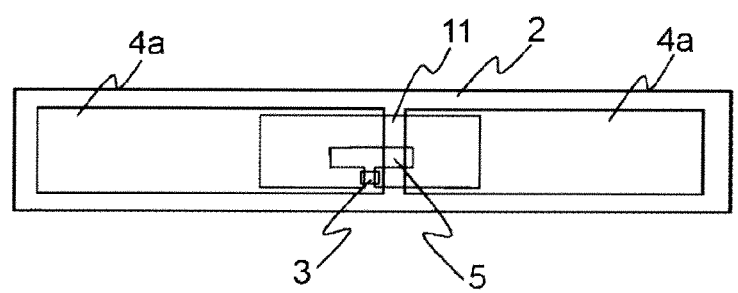
FIG. 8C is a view showing a modified example of the positional relationship between conductors 4a and a slit 5.

According to the third embodiment, the two conductors 4a are arranged to cover the impedance matching circuit of the T-shape slit 5 of the first antenna 11 as shown in FIG. 8A FIG. 8B is a top view of the RFID tag and FIG. 8C is a top view of another RFID tag modified from the RFID tag in FIG. 8A.

First, FIG. 8B is explained. The two conductors 4a are separated at the center of the impedance matching portion which is formed of the T-shape slit 5, and the conductors 4a are formed to extend in the long side direction of the first antenna 11. FIG. 8C is an example that the separation position of the conductors 4a at the impedance matching portion formed of the T-shape slit is determined to be unequal in the lateral length. When the separation position of the conductors 4a is displaced from just below the IC chip 3, the IC chip 3 is mounted at the portion where the first antenna 11, the insulator base material 2 and the conductor 4a are stacked, so that there is an advantage that the IC chip 3 can be mounted on a flat portion in comparison with the case that the IC chip 3 is mounted as shown in FIG. 8B.

Figure 9:
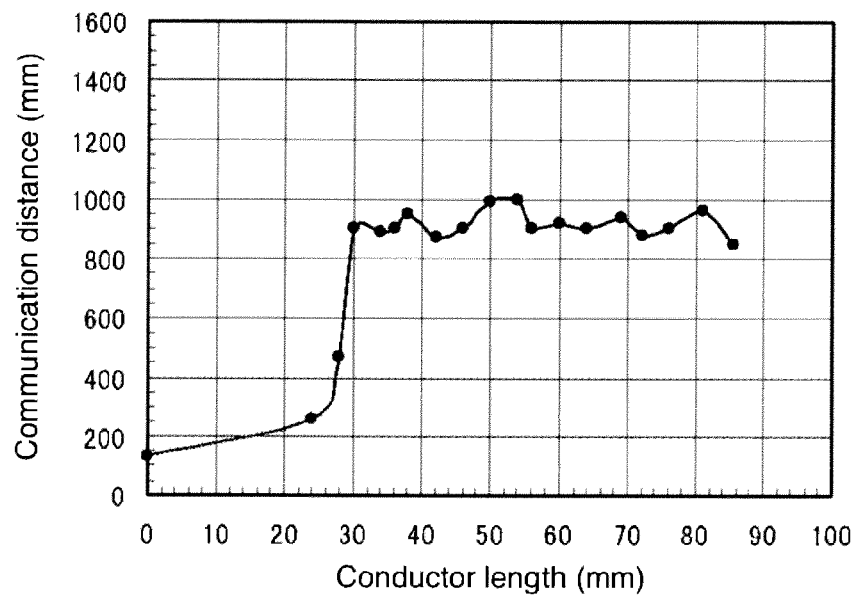
FIG. 9 is a view showing the relationship between the length of the conductor 4a and the communication distance.

FIG. 9 shows a relationship between the length of the conductor 4a and the communication distance. The first antenna 11 is 90 mm long and 3.5 mm wide, and the conductor 4a are 4 mm wide. The communication distance was measured with the lengths of these two conductors 4a varied. The conductor length is a length obtained by adding the two conductors 4a and the gap between the two conductors. Here, there is no characteristic peak until the conductor length becomes 30 to 85 mm and a generally constant communication distance can be obtained. It was determined that the two conductors 4a had a constant gap of 1 mm between them. The measured results were obtained by using the first antenna 11 having the T-shape slit 5 with the length of 30 mm of the impedance matching circuit, so that when the conductors 4a are extended to exceed the both ends of the slit, the protecting function of the impedance matching circuit can be obtained. Since the lengths of the conductors 4a do not affect on the impedance of the first antenna 11, there is an advantage that the first antenna 11 can be adjusted by only the slit length of the impedance matching circuit formed on the first antenna 11.

Figure 10:
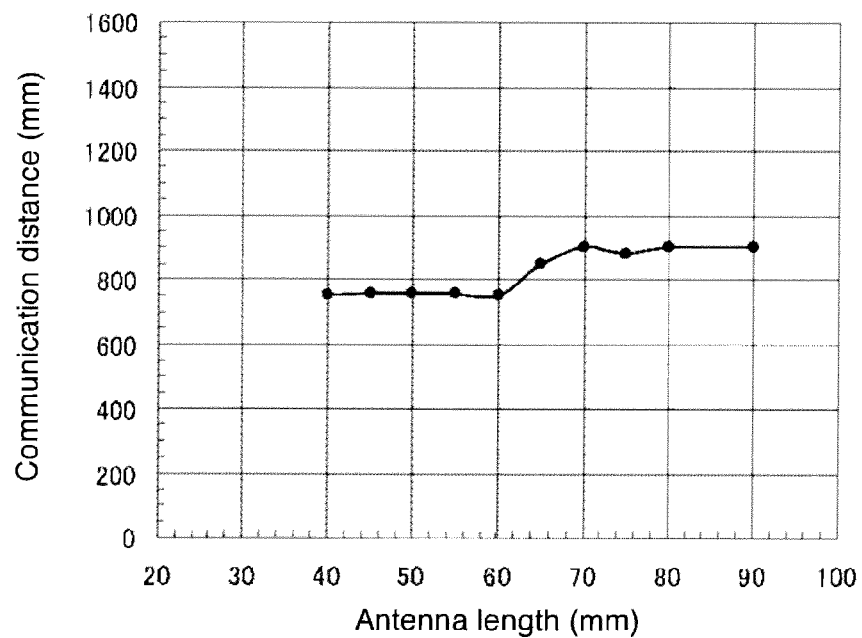
FIG. 10 is a view showing the relationship between a first antenna 11 and a communication distance.

FIG. 10 is a view showing a relationship between the length of the first antenna 11 (antenna width 3.5 mm) and the communication distance. Since a generally constant communication distance can be obtained when the antenna length is 40 to 90 mm, it is seen that the first antenna 11 can be made small. The sum total of the two conductors 4e and the gap is 85 mm.

Figure 11:
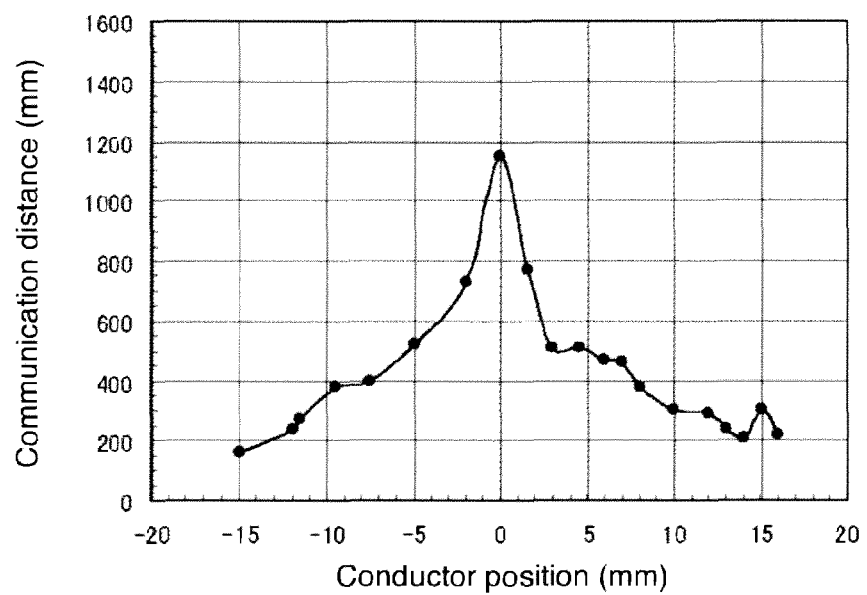
FIG. 11 is a view showing a change in communication distance according to the positional relationship between the gap formed by two conductors 4a and an IC chip.

FIG. 11 shows a communication distance at the distance from the origin, which is the position of the IC chip 3 on the first antenna 11, to the center of the gap formed by the two conductors 4e. The first antenna 11 is 60 mm long and 3.5 mm wide. The conductors 4e are 4 mm wide, and the sum total of their lengths including the gap is 85 mm. The insulator base material 2 is 0.02 mm thick and the gap is 1 mm. Thus, it can be confirmed that the maximum communication distance can be obtained by aligning the gap with the mounting position of the IC chip.

In a case where the IC chip 3 is mounted on the antenna, the mounted position of the IC chip 3 is recessed depending on the positions of the end portions of the conductors 4a, so that there is a possibility that the mounting reliability of the IC chip lowers. To avoid it, it is necessary to increase the gap between the two conductors 4a, but if the gap is increased, the area covering the impedance matching circuit decreases, and the effect of the conductors 4a decreases. Accordingly, there is provided an effect that the mounting portion of the IC chip 3 can be made flat by making the conductors 4a have an unequal length and the separation position offset laterally as shown in FIG. 8C. It is seen from the characteristics of FIG. 11 that when the center of the gap is offset by, for example, 1 mm from the center of the IC chip 3, the communication distance decreases by about 30%, but there are many advantages such that mounting reliability of the IC chip 3 is improved and the manufacturing yield is improved.

Fourth Embodiment

Figure 12A:
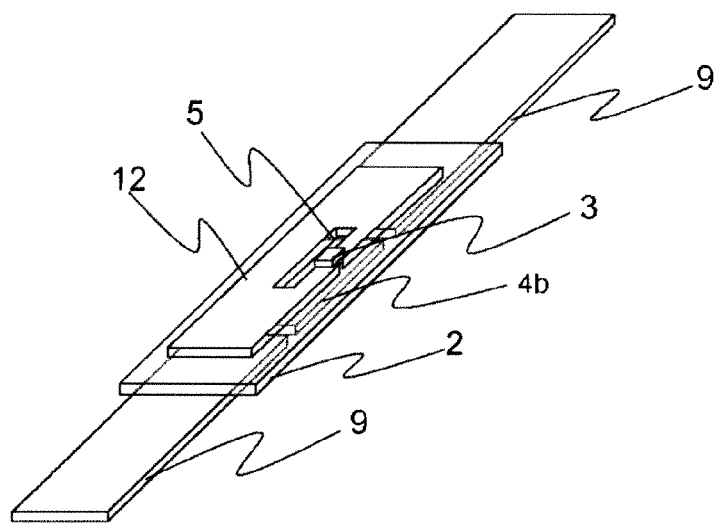
FIG. 12A is a view showing an RFID tag of a fourth embodiment.
Figure 12B:
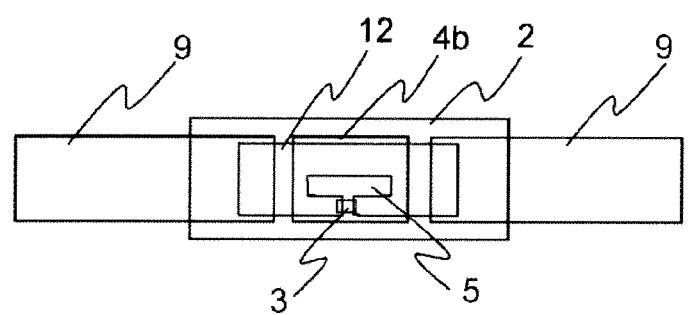
FIG. 12B is a top view of FIG. 12A.

FIG. 12A is a view showing RFID tag of this embodiment, and FIG. 12B shows a top view of FIG. 12A. It is not necessary to extend a conductor 4b formed on the insulator base material 2, and second antennas 9 may be connected as different materials via the insulator base material 2 as shown in FIG. 12A and FIG. 12B. A first antenna and the second antennas are stacked and undergone the capacitance coupling via the insulator. A metal foil or the like may be used for the second antennas 9, and a resin film of polyethylene, polypropylene or the liken and a metal foil of aluminum or the like, or a film having stacked a film, which forms a metal vapor-deposited film or the like, on a resin film may be used as the second antennas 9. When a laminate film is used, the insulator base material 2 and the second antennas 9 can be heat bonded by a heat sealing process, and highly reliable bonding can be achieved at a low cost.

Fifth Embodiment

A fifth embodiment describes an RFID tag which is the RFID tag of the invention provided with the magnetic tag function often used for prevention of illegal taking-out.

Figure 13A:
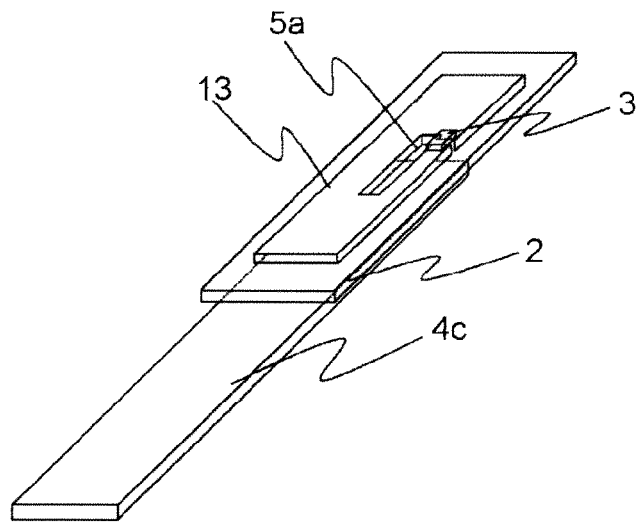
FIG. 13A is a view showing an RFID tag of a fifth embodiment.
Figure 13B:
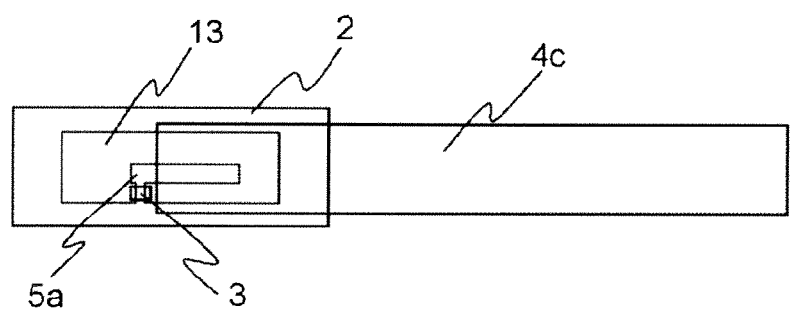
FIG. 13B is a bottom view of FIG. 13A.
Figure 13C:
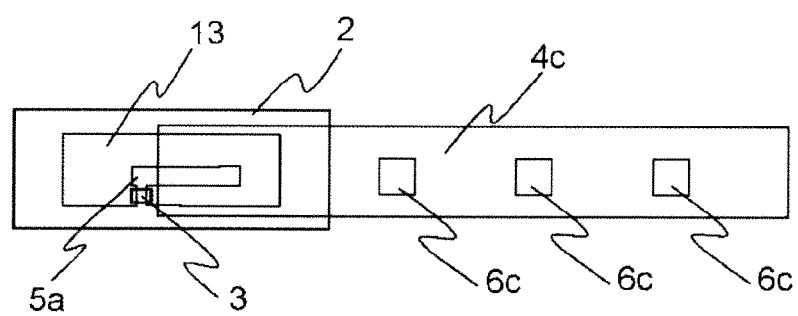
FIG. 13C is a bottom view showing a modified example of FIG. 13A.

FIG. 13A is a view showing the RFID tag of this embodiment, FIG. 13B, 13C are its bottom view. FIG. 13C shows an embodiment that a function is added by placing members 6c on a conductor 4c. As shown in FIG. 13A, a conductor 4c covering an impedance matching circuit which is an L-shape slit 5a is extended toward one side, and a soft magnetic body having electrical conductivity is used as a material for the conductor 4c. Here, the tag length as a whole can be made short by unsymmetrically forming the slit shape of the impedance matching circuit with respect to the longitudinal direction of a first antenna 13. Conventionally, when the magnetic tag and the RFID tag are used together, they are disposed in series. It is not easy to dispose them in parallel because of interference between the magnetic tag and the RFID tag antenna. Therefore, their arrangement in series increases the overall length and therefore has a problem that convenience is lowered. Since the RFID tag antenna material and the magnetic tag member are commonly used as in this embodiment, there is provided an effect that the length of the entire tag can be decreased. It is because the impedance matching circuit formed on the first antenna 13 can be stacked on the conductor 4c in this embodiment. The size and material of the first antenna 13 are same as those of the first embodiment, and the mounting position of the IC chip 3 is offset toward the slit end portion. Since the conductor 4c has electrical conductivity, the impedance matching circuit of the L-shape slit 5a is covered by the conductor 4c via the insulator base material 2 in the same manner as in the previously described embodiment, and there is provided an effect of decreasing a change in impedance due to the influence of a metallic piece or the like approaching to the impedance matching circuit. At the same time when an AC magnetic field which is a characteristic of the soft magnetic body is provided at the same time an effect of the magnetic tag provided by magnetic resonance can be used. Thus, there is provided an effect that an RFID tag having two functions for information management by RFID and an illegal taking-out prevention tag can be obtained. Similarly, the same effect can also be obtained in the embodiment of FIG. 8 by replacing the two members 4a by the members 6c.

In addition, the hard magnetic bodies be formed of a small piece of hard magnetic body are arranged on the conductor 4c formed of a soft magnetic body as shown in FIG. 13C. Thus, the magnetic tag function can be controlled between valid and invalid by magnetization/demagnetization of the hard magnetic bodies 6c. For instance, fire valid/invalid of the magnetic tag function is detected by a detector attached to a gate or the like, so that in case of illegal taking-out, a warning sound of a buzzer or the like can be emitted. Thus, it is possible to determine whether taking-out is legal or not.

Sixth Embodiment

Figure 14A:
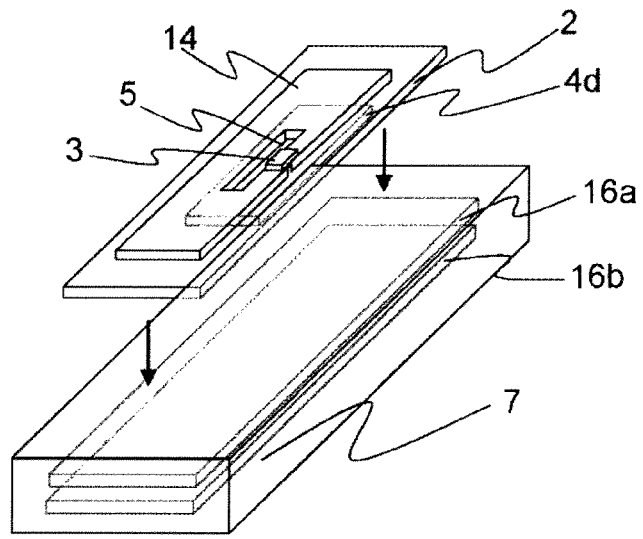
FIG. 14A is a view showing an RFID tag of a sixth embodiment with a resin casing and a conductor.
Figure 14B:
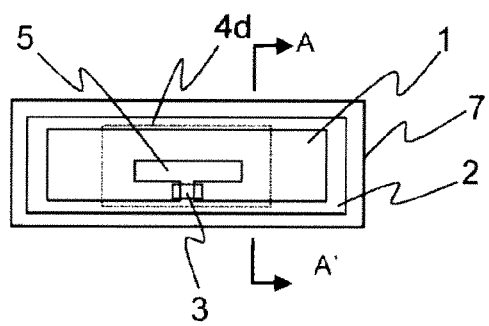
FIG. 14B is a top view of FIG. 14A.
Figure 14C:
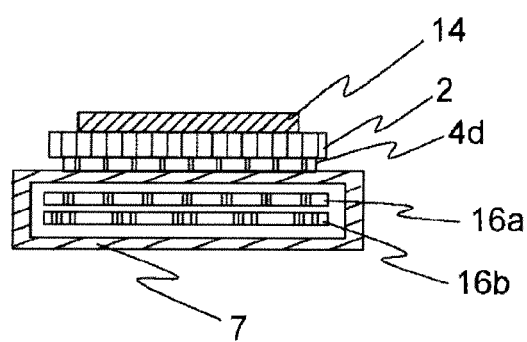
FIG. 14C is the A-A' sectional view of FIG. 14B.

The same effect as in the previous embodiment can be obtained by forming a structure that a soft magnetic body and a hard magnetic body are stacked as shown in FIG. 14 as a modified example of the fifth embodiment. FIG. 14A is a view showing a structure of the RFID tag, FIG. 14B is its top view, and FIG. 14C shows the A-A' sectional view of FIG. 14B. As shown in FIG. 14A, a conductor 4d covering the impedance matching circuit which is a T-shape slit 5 formed in a first antenna 14 is formed of a hard magnetic body. A soft magnetic body 16a which is a member of a soft magnetic body housed in a resin casing is arranged below the conductor 4d. The conductor material covering the impedance matching portion 5 is effective if it has electrical conductivity, so that the material for the conductor 4d may be a soft magnetic body or a hard magnetic body. And, a soft magnetic body 16b may be additionally stacked in order to improve the effect of the magnetic tag. When the conductor 4d is formed of a hard magnetic body, the magnetic tag function can be controlled between valid and invalid by magnetization/demagnetization of the hard magnetic body 4d. Thus, valid/invalid of the magnetic tag function is detected by a detector attached to a gate or the like in the same manner as in the fifth embodiment, so that in case of illegal taking-out, a warning sound of a buzzer or the like can be emitted. Thus, it is possible to determine taking-out is legal or not.

Seventh Embodiment

Figure 15A:
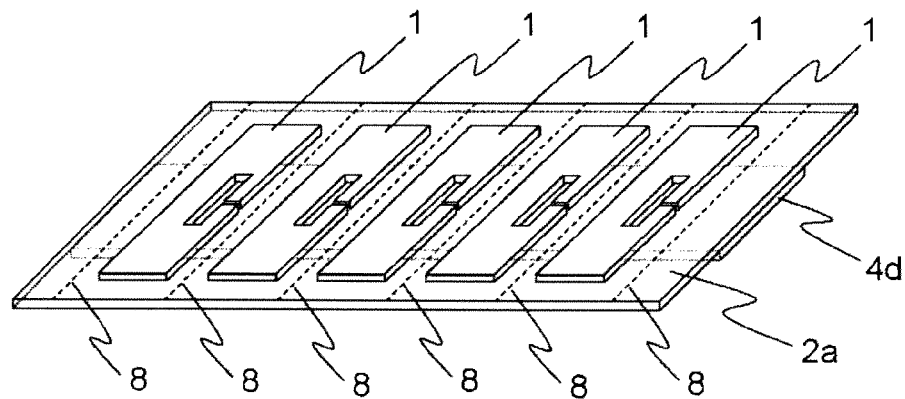
FIG. 15A is a view showing an example of manufacturing the RFID tags of the present invention.
Figure 15B:
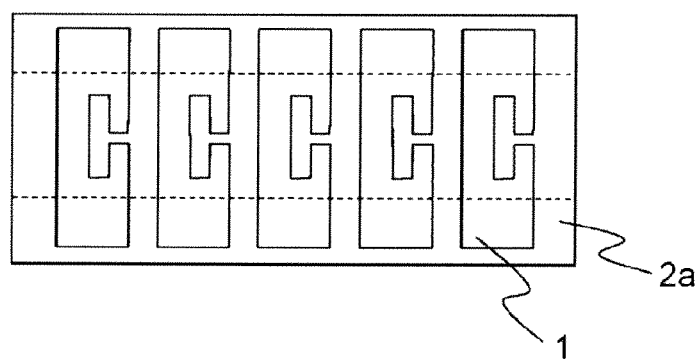
FIG. 15B is a top view of FIG. 15A.
Figure 15C:
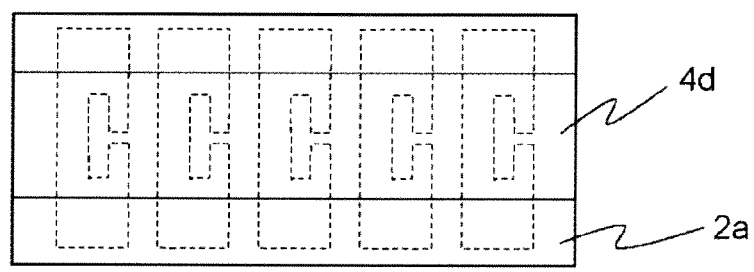
FIG. 15C is a back view of FIG. 15A.

A manufacturing method of RFID tags is described with reference to FIG. 15A, FIG. 15B and FIG. 15C. FIG. 15A shows an appearance view of a tape having first antennas 1 on one side of a tape shape insulator base material 2a and conductors 4d on the other side, FIG. 15B shows the antenna 2 side, and FIG. 15C shows the conductor 4d side. A metal foil of aluminum, copper or the like is applied to both sides of the tape shape insulator base material 2a of PET or PEN which is used generally for the RFID tag, or a metal vapor-deposited film is formed on them. A desired antenna pattern is formed by etching on one side of the film whose its both sides are metal. As another method, a mask may be used to perform metal vapor deposition directly on the base material 2a. The conductors 4d may be formed by applying a conductive material having a desired width to the insulator base material 2a or by vapor deposition as shown in FIG. 15C. By forming the conductors 4d in a single tape shape, there is provided an effect to eliminate the alignment with the antennas formed on the opposite side of the insulator base material 2a. And, there are also an effect of improving manufacturing throughput and yield. Desired RFID tags can be manufactured by mounting the IC chips 3 on the antenna base material having the conductors, and cutting out the individual tags along cutting positions 8 shown in FIG. 15A.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An RFID tag to be attached to articles, comprising:
    an IC chip configured to store information;
    a first antenna to which the IC chip is connected via two terminals of the IC chip and to transmit information stored in the IC chip by radio waves;
    a slit which is provided in the first antenna and to perform impedance matching between the IC chip and the first antenna;
    a conductor having electrical conductivity stacked to cover the slit; and
    an insulator disposed between the conductor and the first antenna,
    wherein the first antenna comprises portions which are not overlapped by the conductor.

2. The RFID tag according to claim 1, wherein the electric length of the first antenna is $\lambda/2$ long or less.

3. The RFID tag according to claim 2, wherein the electric length of the first antenna is $\lambda/6$ to $\lambda/4$.

4. The RFID tag according to claim 1, wherein the conductor is a magnetic body.

5. The RFID tag according to claim 1, wherein the conductor is extended toward one end of the first antenna.

6. The RFID tag according to claim 1, wherein the conductor is separated into two or more.

7. The RFID tag according to claim 6, wherein one of the two separated conductors covers the IC chip.

8. The RFID tag according to claim 6, wherein the IC chip is positioned between the plural conductors.

9. The RFID tag according to claim 6, wherein the conductor is extended toward both ends of the first antenna.

10. The RFID tag according to claim 1, wherein one end or both ends of the first antenna have a second antenna.

11. The RFID tag according to claim 1, wherein the conductor is provided with a cutout portion larger than the IC chip.

12. The RFID tag according to claim 1, wherein the insulator has a thickness of 0.005 mm or more and 0.3 mm or less.

13. A manufacturing method of RFID tags having a first antenna for transmitting information of an IC chip by radio, comprising:
    forming the first antennas at prescribed intervals on one side of an insulator base material;
    mounting the IC chips on a tape shaped insulator base material having a thickness of 0.005 mm or more and 0.3 mm or less with conductors formed on the other side of the insulator base material into a single form; and
    cutting off the insulator base material tape along cutting positions at prescribed intervals.

14. The manufacturing method of RFID tags according to claim 13, wherein the first antennas and the conductors are formed by etching.

15. The manufacturing method of RFID tags according to claim 14, wherein the conductors are formed by pasting a metal foil, metal vapor deposition or spattering.

* * * * *